United States Patent
McLeod et al.

(10) Patent No.: US 10,937,262 B2
(45) Date of Patent: Mar. 2, 2021

(54) DOOR SYSTEM WITH POWER MANAGEMENT SYSTEM AND METHOD OF OPERATION THEREOF

(71) Applicant: Sensormatic Electronics, LLC, Boca Raton, FL (US)

(72) Inventors: Murdo Jamie Scott McLeod, Belfast (GB); Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 11 days.

(21) Appl. No.: 15/690,770

(22) Filed: Aug. 30, 2017

(65) Prior Publication Data

US 2019/0066413 A1 Feb. 28, 2019

(51) Int. Cl.
*G07C 9/25* (2020.01)
*G01S 7/4912* (2020.01)
*G07C 9/00* (2020.01)
*H04W 12/08* (2021.01)
*H04W 12/06* (2021.01)
*G07C 9/22* (2020.01)
*G07C 9/27* (2020.01)
*G07C 9/26* (2020.01)

(52) U.S. Cl.
CPC .......... *G07C 9/257* (2020.01); *G01S 7/4912* (2013.01); *G07C 9/00174* (2013.01); *G07C 9/00722* (2013.01); *G07C 9/00944* (2013.01); *G07C 9/22* (2020.01); *G07C 9/27* (2020.01); *H04W 12/06* (2013.01); *H04W 12/08* (2013.01); *G07C 9/26* (2020.01); *G07C 2209/65* (2013.01)

(58) Field of Classification Search
CPC ........... G07C 9/00087; G07C 9/00103; G07C 9/00174; G07C 9/00031; G07C 9/00722; G07C 2009/00095; G07C 9/257; G07C 9/22; G07C 9/27; G07C 9/00944; G07C 9/26; G07C 2209/65; G01S 7/4912; H04W 12/08; H04W 12/06
USPC ....................................................... 713/186
See application file for complete search history.

(56) References Cited

U.S. PATENT DOCUMENTS

| | | | |
|---|---|---|---|
| 4,682,801 A | 7/1987 | Cook et al. | |
| 5,195,341 A | 3/1993 | Nieuwkoop | |
| 6,259,352 B1 * | 7/2001 | Yulkowski | E05B 47/00 340/5.7 |
| 6,282,407 B1 | 8/2001 | Vega et al. | |
| 6,720,861 B1 * | 4/2004 | Rodenbeck | G07C 9/00817 340/5.64 |
| 8,772,978 B2 | 7/2014 | Ichikawa et al. | |
| 9,845,623 B1 * | 12/2017 | Gage | E05B 81/76 |
| 9,984,523 B1 | 5/2018 | Shen | |
| 10,158,831 B1 * | 12/2018 | Taub | H04N 7/142 |
| 2006/0114099 A1 | 6/2006 | Deng et al. | |

(Continued)

*Primary Examiner* — Aravind K Moorthy
(74) *Attorney, Agent, or Firm* — HoustonHogle LLP

(57) ABSTRACT

A door system and method for a door system is disclosed. A door body of the door system carries access control system components such as access readers, request to exit devices, and possibly magnetic lock systems, in examples. In embodiments, other devices carried by the door body include detection devices that detect physical phenomena, an interactive display, a door controller, and a power management system. The power management system provides a source of power to the other devices carried by the door body.

27 Claims, 7 Drawing Sheets

(56) References Cited

U.S. PATENT DOCUMENTS

| | | | |
|---|---|---|---|
| 2007/0124427 A1* | 5/2007 | Light | H04L 63/10 709/218 |
| 2007/0146115 A1 | 6/2007 | Roosli et al. | |
| 2007/0198850 A1* | 8/2007 | Martin | G07C 9/257 713/186 |
| 2007/0204663 A1* | 9/2007 | Lee | G07C 9/27 70/279.1 |
| 2008/0017726 A1* | 1/2008 | Neumann | G01D 21/00 237/2 A |
| 2008/0198228 A1* | 8/2008 | Rizk | B60R 1/008 348/148 |
| 2008/0209965 A1* | 9/2008 | Maack | G06F 21/554 70/262 |
| 2008/0218330 A1* | 9/2008 | Biles | G07C 9/00896 340/506 |
| 2008/0222963 A1* | 9/2008 | Zwart | E05B 47/00 49/503 |
| 2009/0302995 A1* | 12/2009 | Park | E06B 7/02 340/3.1 |
| 2010/0097225 A1* | 4/2010 | Petricoin, Jr. | G08B 25/008 340/573.1 |
| 2010/0290542 A1 | 11/2010 | Peabody et al. | |
| 2012/0267962 A1 | 10/2012 | Hanchett, Jr. | |
| 2013/0167190 A1* | 6/2013 | Jankowski | G06F 21/552 726/1 |
| 2013/0260676 A1 | 10/2013 | Singh | |
| 2013/0342342 A1* | 12/2013 | Sabre | G09F 13/18 340/509 |
| 2014/0070003 A1* | 3/2014 | Radicella | G07C 9/00111 235/382 |
| 2014/0159388 A1 | 6/2014 | Liao | |
| 2014/0265359 A1* | 9/2014 | Cheng | E05B 47/026 292/144 |
| 2014/0274033 A1* | 9/2014 | Smart | H04W 52/028 455/426.1 |
| 2014/0282048 A1* | 9/2014 | Shapiro | H04L 12/2825 715/741 |
| 2014/0282993 A1* | 9/2014 | Van Till | H04L 63/08 726/9 |
| 2014/0292096 A1 | 10/2014 | Yamada | |
| 2014/0340032 A1* | 11/2014 | Curtis | G07C 9/00309 320/108 |
| 2015/0116082 A1* | 4/2015 | Cregg | E05B 45/00 340/5.61 |
| 2015/0211270 A1 | 7/2015 | Benhammou | |
| 2015/0222517 A1* | 8/2015 | McLaughlin | H04L 63/0435 713/156 |
| 2015/0243195 A1* | 8/2015 | Escobedo | G09F 11/23 40/492 |
| 2015/0249548 A1* | 9/2015 | Rasband | A61B 17/00 370/254 |
| 2015/0348220 A1* | 12/2015 | Sharma | G06Q 50/265 705/324 |
| 2016/0047144 A1 | 2/2016 | McMillan et al. | |
| 2016/0077575 A1* | 3/2016 | Paul | G06F 1/3237 713/323 |
| 2016/0087687 A1 | 3/2016 | Kesler et al. | |
| 2016/0275781 A1* | 9/2016 | Nold | G08B 13/08 |
| 2016/0307683 A1 | 10/2016 | Davis et al. | |
| 2016/0343181 A1* | 11/2016 | Cheng | G07C 9/00309 |
| 2017/0010652 A1* | 1/2017 | Huang | G06F 1/3234 |
| 2017/0091998 A1* | 3/2017 | Piccolo, III | G06F 3/147 |
| 2017/0101076 A1* | 4/2017 | Krishnan | H04W 4/80 |
| 2017/0178013 A1* | 6/2017 | Beloglazov | G06Q 10/10 |
| 2017/0186254 A1* | 6/2017 | Dumas | E05B 47/06 |
| 2017/0228603 A1* | 8/2017 | Johnson | G08B 13/19628 |
| 2017/0238401 A1 | 8/2017 | Sadwick et al. | |
| 2017/0243455 A1* | 8/2017 | Johnson | G08B 13/19695 |
| 2017/0263065 A1* | 9/2017 | Johnson | G06F 8/65 |
| 2017/0284129 A1* | 10/2017 | King | A61G 7/1065 |
| 2017/0332055 A1* | 11/2017 | Henderson | H04N 7/186 |
| 2017/0373723 A1 | 12/2017 | Toivonen et al. | |
| 2018/0058099 A1* | 3/2018 | Wurm | E05B 47/0046 |
| 2018/0075961 A1 | 3/2018 | Davis et al. | |
| 2018/0076664 A1 | 3/2018 | Wright | |
| 2018/0213191 A1* | 7/2018 | Shen | G07C 9/00563 |
| 2019/0186181 A1 | 6/2019 | Robertson | |

* cited by examiner

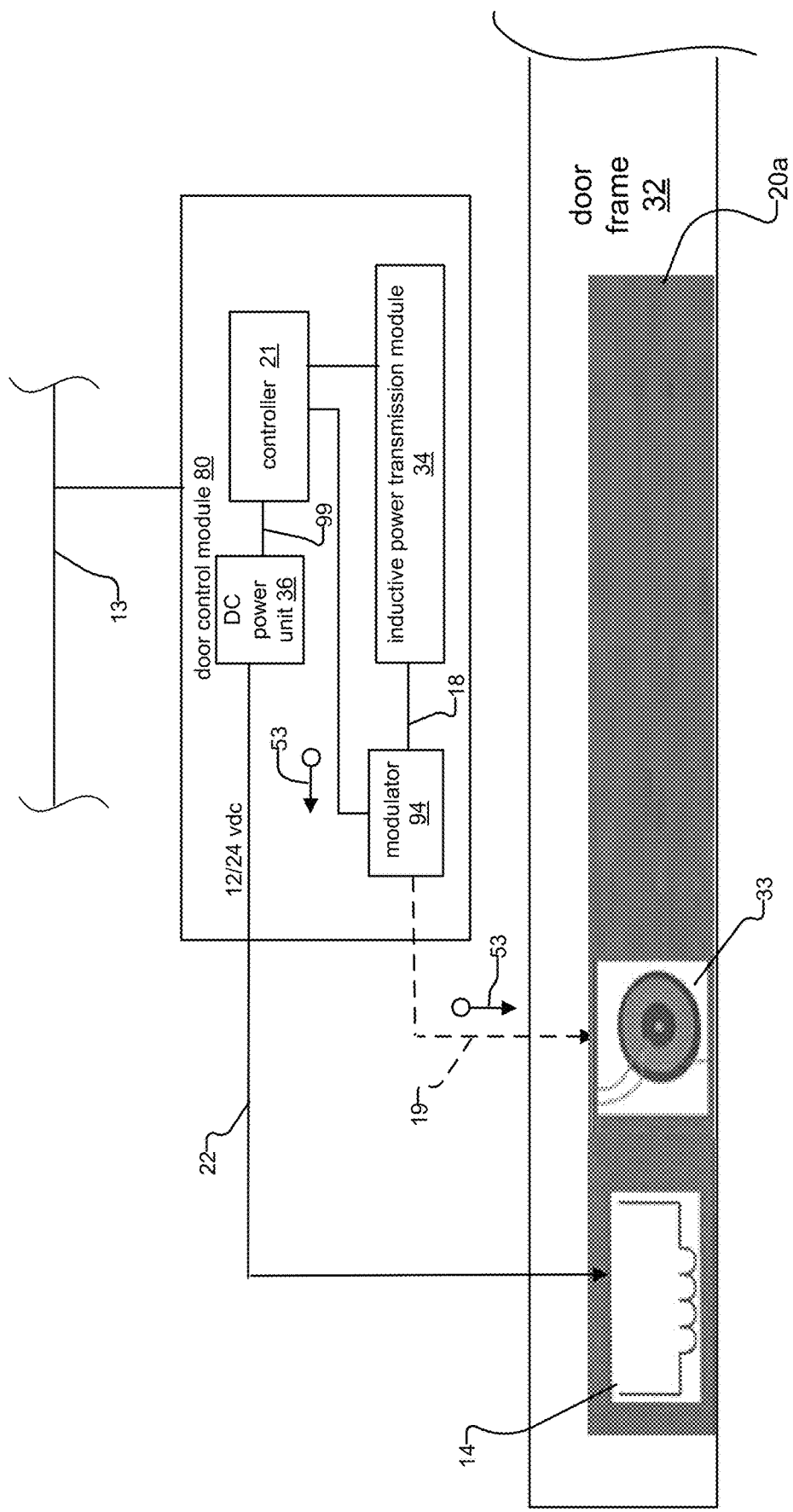

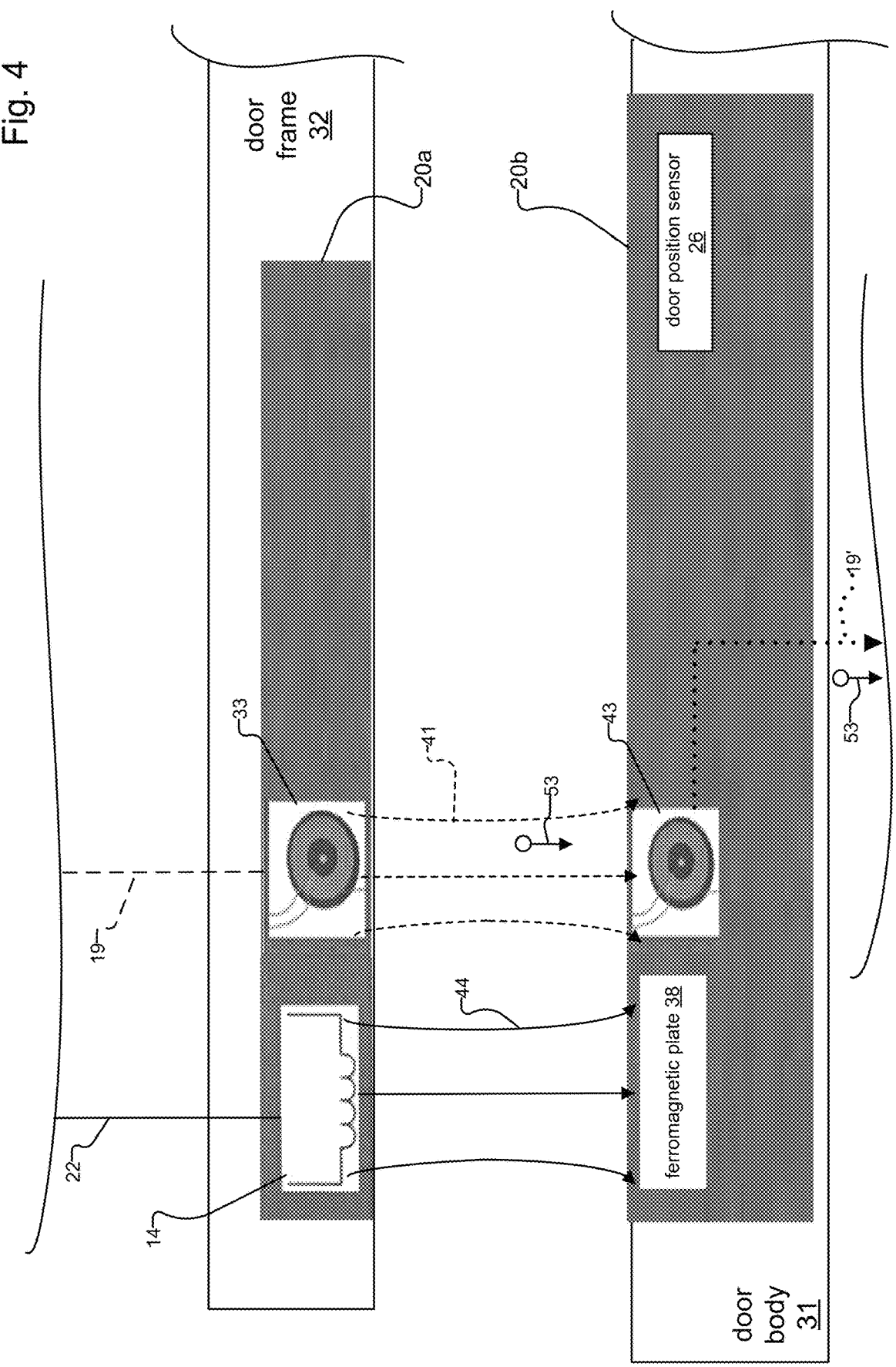

DOOR SYSTEM WITH POWER MANAGEMENT SYSTEM AND METHOD OF OPERATION THEREOF

RELATED APPLICATIONS

This application is related to:

U.S. application Ser. No. 15/690,743 filed on Aug. 30, 2017, entitled "System and Method for Inductive Power Transfer to Door," now U.S. Patent Publication No.: 2019-0063128A1; and U.S. application Ser. No. 15/690,763 filed on Aug. 30, 2017, entitled "System and Method for Providing Communication Over Inductive Power Transfer to Door," now U.S. Patent Publication No.: 2019-0066419A1.

All of the afore-mentioned applications are incorporated herein by reference in their entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, access control readers, video surveillance cameras, network video recorders (NVRs), and door controllers, to list a few examples.

Access control systems in buildings, for example, are principally concerned with physical security and the selective access to, restriction of, and/or notification of access to a place or other resource. Historically, the main components of the access control systems were access control readers, request to exit (REX) devices, and possibly door control modules and possibly door locking systems. The REX devices and the access readers were installed near access points, such as doors or hallways or elevators. The REX devices were usually installed to allow users to exit restricted or controlled areas of the building. The access control readers, on the other hand, were often installed to enable presentation of credentials to obtain access to restricted areas, such as buildings or areas of the buildings.

The ways in which individuals would interact with REX devices depends on the type of the REX devices. In one example, the REX devices have a button that the individuals would manually select. In another example, the REX devices have an integrated passive infrared sensor (PIR) that would detect the individual as the individual approaches the door. In response to the button selection of the REX devices or detection of users by the REX devices, the REX devices would then send signals to the door control modules to request exit. The door control modules, in turn, would then operate the door locking system to unlock the doors.

Typically, individuals would interact with the access control readers by swiping keycards or bringing contactless smart cards within range (approximately 2-3 inches or 5 centimeters) of the reader. The access control readers would read the credential information of the keycards and validate the information possibly by reference to a verification system that confirmed the credentials and determined if the individuals were authorized to access the restricted areas. If the individuals were authorized, then the door control modules might be signaled to operate the door locking system to unlock doors, for example.

The access control readers and REX devices are most often mounted to a wall next to a door frame of the door. Input power is usually provided to each of the access readers and REX devices via electrical cabling within the walls near each door.

The door locking systems can take a number of forms. Some include mechanical release latches on the doorframe that are directly controlled by the door control module. In other examples, the door locking systems are battery-powered and included as part of the door knob assembly. These systems are common in hotels. Magnetic lock systems are still another example.

The magnetic lock systems typically include a number of components and are often controlled by the door control module. An electromagnet typically is mounted to the door frame of the door and an armature, a ferromagnetic plate, is mounted to the door. Electrical energy supplied to the electromagnet creates a magnetic field that attracts the ferromagnetic plate with enough force to keep the door closed. When a user presents valid credentials to an access reader mounted at the door, in one example, the verification system sends a signal to the door control module for the door, which in turn deenergizes the electromagnet, thus allowing the door to be opened.

SUMMARY OF THE INVENTION

The present invention concerns a door system that includes multiple devices that are made part of the door, such as components of access control systems, in one example. The devices are carried via a door body of the door system. "Carried by the door body" can include: fastening devices directly to the door body, such as by fastening with screws and/or bolts; attaching mounting brackets to the door body, and then attaching individual devices and/or assemblies to the mounting brackets, and fastening individual devices and/or assemblies within a recess or core of the door body, in examples. Components of access control systems that can be carried by the door body include access readers, REX devices, and possibly door locking systems such as magnetic lock systems, in examples.

The door body of the inventive door system can also carry devices other than components of access control systems. In one example, the door body can carry devices that enable communications between the door system and devices near the door frame. In another example, the door body can carry devices that provide a source of power to other components carried by the door body. In still another example, the door body can carry a controller such as a microcontroller. The controller receives and processes information sent from other devices carried by the door body, and can send information to the other devices. In yet another example, the door body can carry detection devices that detect various physical phenomena within buildings.

In general, according to one aspect, the invention features a door system. The door system includes a door body and a power management system carried by the door body. The power management system powers other devices carried by the door body.

The door system can also include an access reader, carried by the door body, that reads user credentials of users. In one example, the access reader includes a Bluetooth Low Energy (BLE) transceiver, which includes an antenna, for receiving credentials from a user device. Additionally and/or alternatively, the door system can also include a position sensor, carried by the door body, for reporting an open and/or closed state of the door body.

Additionally and/or alternatively, the door system can also include a touch sensing door plate carried by the door body for detecting a user touching the door body. Preferably, the door system includes a door controller, carried by the door body, that controls the power management system and the other devices carried by the door body. Typically, in response to the door controller receiving an indication of a user being at the door body sent from at least one of the other devices carried by the door body, the door controller sends a request message to a door control module to unlock the door system.

Additionally and/or alternatively, the door system can also include a WiFi transceiver carried by the door body for communicating with a central control system. Preferably, the door system also includes a display device, carried by the door body, that receives signage information and displays the signage information.

Additionally and/or alternatively, the door system can also include one or more detection devices, carried by the door body, which detect physical phenomena within and/or near the door body. In one example, the door system includes an inductive power receiver, carried by the door body, that receives inductively transferred power from an inductive power transmitter included within a door frame. The inductive power receiver then provides power to the power management system.

In general, according to another aspect, the invention features a method for a door system. The method includes a door body of the door system carrying a power management system, the power management system providing power to other devices carried by the door body.

In general, according to another aspect, the invention features a door system network. This network comprises door systems, in which each door system includes one or more wireless transceivers. The transceivers establish wireless links between the door systems to form a mesh network.

In general, according to another aspect, the invention features a method for providing connectivity to door systems. This method comprises providing the door systems with respective wireless transceivers and establishing wireless links between the door systems to form a mesh network.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 shows detail for a frame magnetic lock assembly of the magnetic lock system in FIG. 1, and also shows devices on a door frame side that interface with the frame magnetic lock assembly;

FIG. 4 shows more detail for the magnetic lock system, including interfacing and signals sent from the frame magnetic lock assembly to a door magnetic lock assembly of the magnetic lock system;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
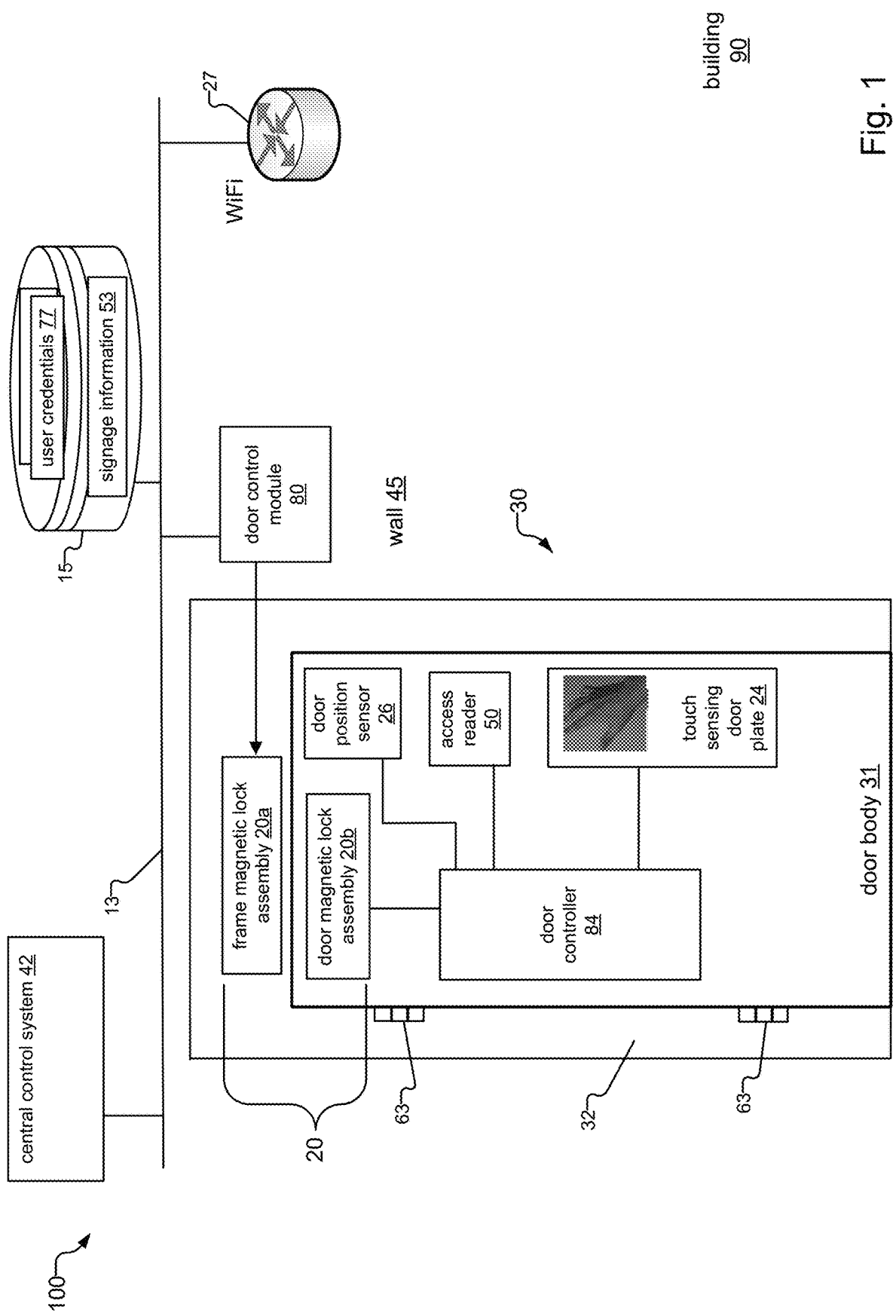
FIG. 1 is a schematic diagram showing an embodiment of a door system of the present invention integrated with an access control system, where a door body of the door system carries devices such as an access reader, and where the diagram also shows the relationship between the door system and a magnetic lock system mounted to the door body and to a door frame.

FIG. 1 shows a door system 30 that includes various devices integrated with the door body 31, such as an access control system 100. The access control system 100 also includes a door control module 80, a WiFi access point 27, and a central control system 42. The central control system 42, in one example, functions as a verification system for verifying user credentials 77 of users.

Major components of the door system 30 include a door body 31 of a door that is mounted in a door frame 32, and a magnetic lock system 20 mounted between the door frame 32 and the door body 31. The magnetic lock system 20 includes a frame magnetic lock assembly 20a mounted to the door frame 32 and a door magnetic lock assembly 20b carried by the door body 31. The door body 31 is attached to the door frame 32 by hinges 63 that enable opening and closing of the door body 31. The present door system 30 could also be applied to sliding doors, however.

In the illustrated example, the door body 31 also carries devices including a door controller 84, an access reader 50, a door position sensor 26, and a capacitive touch sensing REX device in the form of a touch sensing door plate 24. In another implementation, the capacitive touch sensing REX device is integrated within a door handle, such as a metal door handle of the door body 31.

The frame magnetic lock assembly 20a receives power from the door control module 80. The door control module 80 communicates with the central control system 42 and the WiFi access point 27 over a local/enterprise network 13. The door control module 80 is typically mounted on a wall 45 near the door frame 32.

A database 15 connected to the local network 13 stores user credentials 77 of users and signage information 53. Alternatively, in another implementation, the database 15 is directly connected to the central control system 42 rather than via the local network 13. In this implementation, the direct connection of the database 15 to the central control system 42 provides heightened data security for the user credentials 77 and other information stored within the database 15.

The door controller 84 is a microcontroller, in one example. The door controller 84 communicates with other devices carried by the door body 31 including the door magnetic lock assembly 20b, the access reader 50, the door position sensor 26, and the touch sensing door plate 24.

The door position sensor 26 reports an open and/or closed state of the door body 31 to the door controller 84. The touch sensing door plate 24 detects a user touching the door body 31, and reports an indication of the user being at the door body 31 to the door controller 84.

The signage information 53 includes information for consumption and display at the door body 31. Examples of signage information 53 include product advertising information, announcements that describe current or future events, status information for various equipment in the building 90, and information to display during an emergency. When an emergency such as a fire, intrusion alert, or earthquake is occurring, the signage information 53 can also include warning messages and instructions to assist the user for exiting the building 90 or sheltering in place, in examples. The signage information 53 is forwarded to door controllers 84 for door systems that further include display devices, as discussed later herein.

Though only one door system 30 is shown, it can be appreciated that the door control module 80 can control the locking and unlocking of multiple door systems 30 within the building 90.

In an example, users at the door 30 present their user credentials 77 to the access reader 50 carried by the door body 31 to obtain access to the building 90. The access reader 50 sends the user credentials 77 in messages to the door control module 80, which in turn sends the user credentials 77 to the central control system 42 for verification. Upon verification of the user credentials 77, the central control system 42 sends a signal for unlocking the door 30 to the door controller module 80. The door controller module 80, in turn, sends a signal to the frame magnetic lock assembly 20a to unlock the door 30 or simply cuts power to the electromagnet in the frame magnetic lock assembly 20a.

Figure 2:
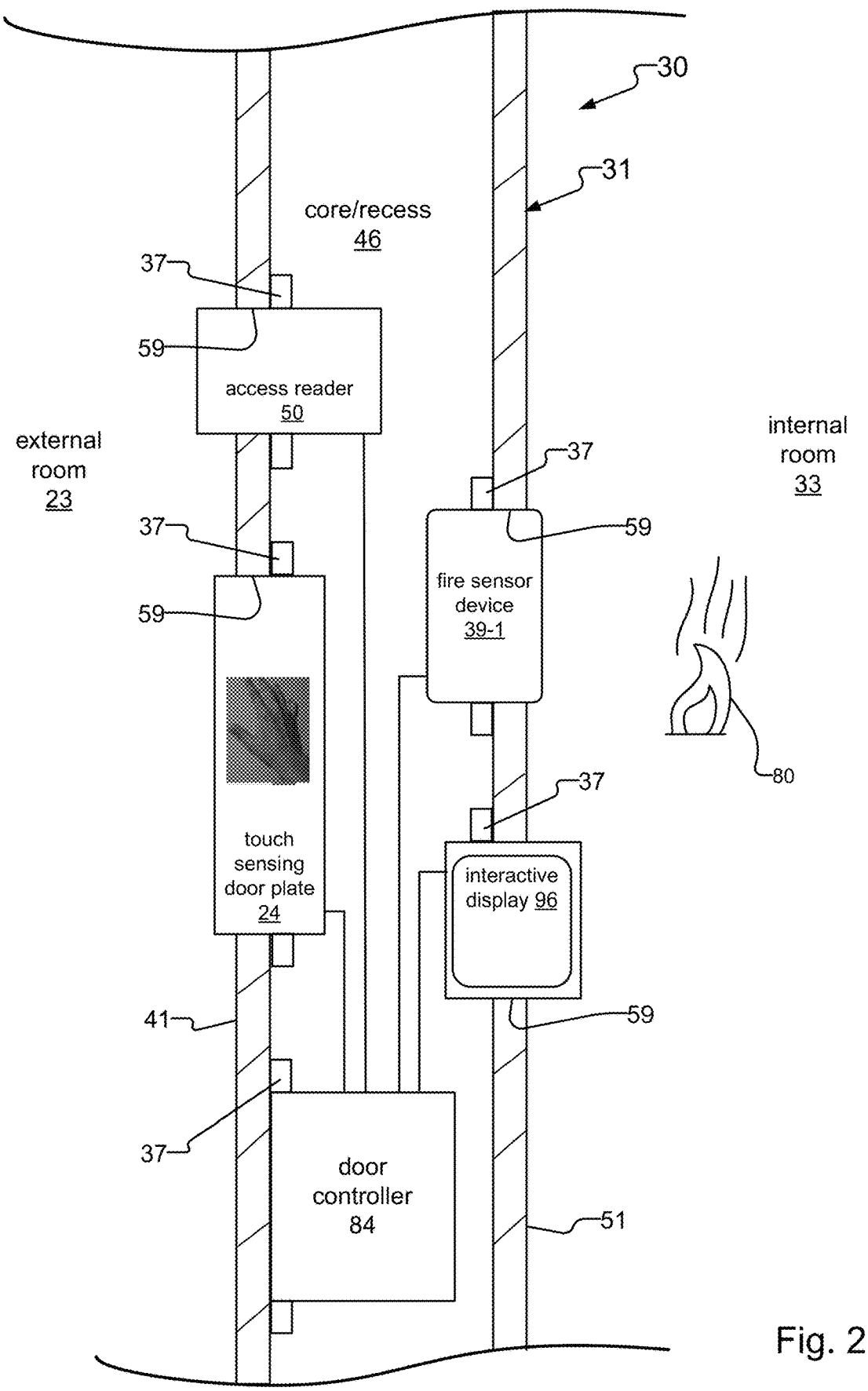
FIG. 2 shows a cross-section of a door body of another embodiment of the door system, viewed from an edge of the door body, where the door body carries various devices including a fire sensor device as an example of a detection device.

FIG. 2 shows detail for a cross-section of the door body 31 showing how devices are integrated with the door body 31 of the door system 30.

The door body 31 has a core or recess 46 that is sandwiched between an external skin 41 and an internal skin 51. The external skin 41 faces an external room 23 within the building 90, and the internal skin 51 faces an internal room 33. These skins will typically be sheets of metal, wood, plastic or glass.

Devices carried by the door body 31 in this example include an access reader 50, a sensor device, e.g., fire sensor device 39-1 as one example of a detection device 39, a touch sensitive door plate 24, an interactive display 96, and a door controller 84. Installers create openings 59 within the skins 41/51 to enable devices to be carried by the door body 31 and to facilitate wiring between the door controller 84 and the devices, in examples. Each of the devices typically have mounting brackets 37. The devices fasten to the skins 41/51 via the mounting brackets 37.

Other examples of detection devices 39 and the associated phenomena that these devices detect include: motion sensor devices that detect motion and unauthorized access to a building; object proximity sensor devices (e.g. PIR, ultrasonic, radar); environmental sensors that detect temperature, air pressure or acoustic level, light or color, humidity or moisture, movement or acceleration (e.g. accelerometer), pressure (e.g. strain gauge), natural gas, or noxious vapors or chemically toxic environments, electromagnetic radiation (ionizing and non-ionizing), and magnetic fields (e.g. Gaussian, Helmholtz); and fire sensor devices that detect heat/flame or burning particles, smoke, and carbon monoxide.

In one example, the access reader 50 and the touch sensing door plate 24 are carried by the door body 31 by mounting these devices within their respective openings 59 in the exterior skin 41 of the door body 31. The access reader 50 and the touch sensing door plate 24 are mostly included within the core/recess 46 of the door body 31 but also extend beyond the external skin 41. This extension allows users to interact with these devices. In another example, the fire sensor device 39-1 is carried by the door body 31 by mounting the device within an opening 59 in the interior skin 51 of the door body 31. The opening 59 also enables the detection devices 39 to detect physical phenomena within the internal room 33 such as smoke/fire 80.

FIG. 3 shows an example of the frame magnetic lock assembly 20a of the magnetic lock system 20. The frame magnetic lock assembly 20a includes a lock coil 14 and an inductive power transmitter 33. The door control module 80 includes a DC power unit 36, a controller 21, a modulator 94, and an inductive power transmission module 34. The DC power unit 36 and the modulator 94 are under control of the controller 21. The controller 21 controls the locking and unlocking of the door 30, in one example, by sending a control signal 99 to activate or deactivate the DC power unit 36. The DC power unit 36 provides a dc power signal 22 to power the lock coil 14, i.e., electromagnet. Typically, the dc power signal 22 is either 12 or 24 VDC. To lock the door 30, the controller 21 sends a control signal 99 to activate the DC power unit 36, thus enabling the dc power signal 22. The inductive power transmission module 34, which is installed on the door frame 32, then provides an alternating current (ac) inductive power transfer signal 18 to an inductive power transmitter 33. To unlock the door 30, the controller 21 sends a control signal 99 that deactivates the DC power unit 36, thus disabling the dc power signal 22 and removing power to the lock coil 14.

Under control of the controller 21, the inductive power transmission module 34 provides an alternating current (ac) inductive power transfer signal 18 to the modulator 94. The controller 21 also provides data to the modulator 94. In one example, the data is signage information 53. Additionally, the controller 21 of the door control module 80 can encrypt the data prior to sending the data to the modulator 42.

The modulator 94 then creates a modulated ac power signal 19 from both the ac inductive power transfer signal 18 and the data (if provided by the controller 21). As a result, the data (if present) is encoded within the modulated ac power signal 19, and the modulated ac power signal 19 is then transmitted to the inductive power transmitter 33. Because the data is encoded by modulation, the data is also referred to as being carried by the modulated ac power signal 19.

FIG. 4 shows more detail for the magnetic lock system 20, including interfacing and signals between the frame magnetic lock assembly 20a and the door magnetic lock assembly 20b.

The door magnetic lock assembly 20b includes a ferromagnetic plate 38, an inductive power receiver 43, and a door position sensor 26. The door system 30 is normally closed and locked. The dc power signal 22 energizes the lock coil 14, which in turn applies a magnetic field 44 that attracts the ferromagnetic plate 38. Additionally, the door frame 32 transmits a modulated inductive power transfer signal 41 to the inductive power receiver 43 mounted to the door body 31.

Within the frame magnetic lock assembly 20a, the ac inductive power input signal 22 energizes the inductive power transmitter 33. The inductive power transmitter 33, in turn, creates a modulated inductive power transfer signal 41 in the form of a magnetic field that radiates toward the inductive power receiver 43 of the door magnetic lock assembly 20b. Through magnetic induction, the inductive power receiver 43 receives and transduces the modulated inductive power transfer signal 41 into a door modulated ac power signal 19' at the door body 31. The modulated inductive power transfer signal 41 and door modulated ac power signal 19' carry the encoded data for consumption and display at the door body 31, when applicable.

Figure 5A:
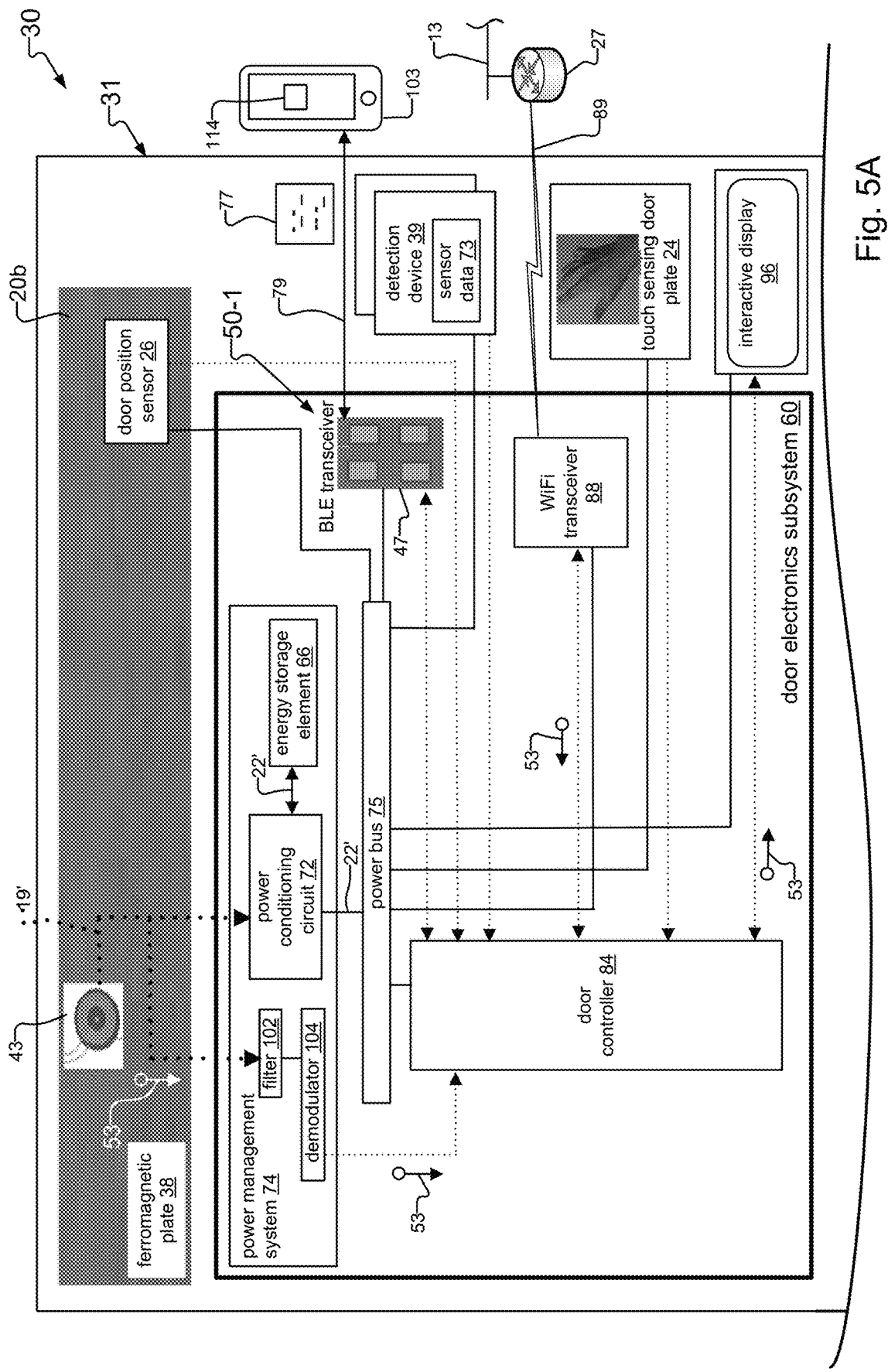
FIG. 5A shows detail for a door body of another embodiment of the door system, where the door body carries various devices including a frictionless access reader as the access reader, and a power management system for providing power to the other devices at the door.

FIG. 5A shows more detail for another embodiment of the door system 30. Here, the door body 31 carries a door electronics subsystem 60, one or more detection devices 39, a touch sensing door plate 24, and an interactive display 96. The door electronics subsystem 60 is an assembly that includes other components/devices. Devices within the door electronics subsystem 60 include a power management system 74, a power bus 75, a door controller 84, an access reader 50-1 and a WiFi transceiver 88. The access reader 50-1 includes a Bluetooth Low Energy (BLE) transceiver 47 that receives user credentials 77 from users on user devices 103.

The power management system 74 includes a power conditioning circuit 72 and an energy storage element 66. The power management system 74 also includes a filter 102 and a demodulator 104. The power conditioning circuit 72 receives the door modulated ac power signal 19' from the inductive power receiver 43. Then, the power conditioning circuit 72 converts the door modulated ac power signal 19' to a door dc power signal 22' to provide power to devices at the door body 31. The power conditioning circuit 72 can provide ripple reduction of the door modulated ac power signal 19' and converts (e.g. by rectification) the door modulated ac power signal 19' into the door dc power signal 22'.

The power management system 74 also extracts data encoded within the door modulated ac power signal 19'. For this purpose, in one example, the filter 102 first filters the door modulated ac power signal 19' and the demodulator extracts the encoded data from the door modulated ac power signal 19'.

The demodulator 104 extracts the data from the door modulated ac power signal 19' by demodulating the door modulated ac power signal 19.' As a result, the demodulator obtains the data in the form sent by the controller 21 (i.e. in decoded form). The demodulator 104 then passes the data to the door controller 84. The door controller 84 receives the data, and decrypts the data (if the controller 21 had encrypted the data). In one example, the data is signage information 53.

The door dc power signal 22' provides power to the door electronics subsystem 60 and other devices carried by the door body 31 via the power bus 75. In examples, the power bus 75 distributes the door dc power signal 22' to the door position sensor 26, the interactive display 96, the touch sensing door plate 24, the detection devices 39, and the door controller 84 and WiFi transceiver 88 of the door electronics subsystem 60. The door controller 84 is typically a microcontroller. The power conditioning circuit 72 also charges the energy storage element 66 with the door dc power signal 22'. In examples, the energy storage element 66 is a rechargeable energy source such as a supercapacitor or a rechargeable battery.

When the door body 31 is opened by a user, the power management system 74 cannot provide power to the door body 31 transduced from the modulated inductive power transfer signal 41. As a user opens the door body 31, the inductive power receiver 43 is no longer located near the inductive power transmitter 33, and the inductive power receiver 43 cannot receive the modulated inductive power transfer signal 41 as a result. Consequently, the door modulated ac power signal 19' is not available at the door body 31. Moreover, the power management system 74 cannot receive data when the door body 31 is open because the modulated inductive power transfer signal 41 carries the data.

However, when the door modulated ac power signal 19' is not available at the door body 31, such as when the door body 31 is open, the power management system 74 can provide power to the door body 31 via the stored door DC power signal 22' of the energy storage element 66. The power conditioning circuit 72 of the power management system 74 provides the stored door DC power signal 22' to the power bus 75. The power bus 75 then powers the door electronics subsystem 60 and other devices carried by the door body 31. In this way, the power management system 74 can ride through a disconnection of the modulated inductive power transfer signal 41.

The power management system 74 also alternates between powering the door body 31 via the modulated inductive power transfer signal 41 and via the stored door DC power signal 22' from the energy storage element 66, based on the availability of the modulated inductive power transfer signal 41 at the door body 31. The power management system 74 can then switch back to providing power to the door body 31 from the door modulated ac power signal 19' when the modulated inductive power transfer signal 41 at the door body 31 is restored.

In any event, when the modulated inductive power transfer signal 41/door modulated ac power signal 19' is restored, the power conditioning circuit 72 uses some of the input power to recharge the energy storage element 66 so that it is fully charged for the next time the door body 31 is opened. The remaining power from the door modulated ac power signal 19' is used to provide power on the power bus 75, to the other devices of the door electronics subsystem 60, and to other devices carried by the door body 31.

The door controller 84 controls the one or more detection devices 39, the touch sensing door plate 24, the interactive display 96, and devices of the door electronics subsystem 60. In examples, the door controller 84 also controls the power management system 74, the power bus 75, the access reader 50-1/BLE transceiver 47 and the WiFi transceiver 88. The door controller 84 controls the devices via wired and/or wireless connections between the door controller 84 and each of the devices. The connections enable the door controller 84 to send/receive control signals, messages, signage information 53, and/or user credentials 77 to/from various devices, in examples.

The WiFi transceiver 88 establishes a WiFi link 89 to the WiFi access point 27. The WiFi access point 27, in turn, communicates with the door control module 80 and central control system 42 via the local network 13. The communications path formed by the WiFi transceiver 88/WiFi link 89/WiFi access point 27/local network 13 provides bidirectional communications between the door controller 84 and the door control module 80. The bidirectional communications path between the door controller 84 and the door control module 80/central control system 42 is also known as a duplex communications channel. The door controller 84 also receives an indication that the door is open and/or closed from the door position sensor 26.

In another implementation, the door control module 80 includes a WiFi interface. As a result, the WiFi access point 27 can provide a wireless duplex communications channel directly between the WiFi transceiver 88 on the door body 31 and the door control module 80 and/or directly with the central control system 42.

On the other hand, in yet another implementation, the door controller 84 includes software/firmware that enables the WiFi transceiver 88 and/or the Bluetooth (BLE) transceiver 47 to support mesh network connectivity. Generally, mesh networks have a topology where each node can relay data across the network traversing through multiple nodes. These mesh nodes cooperate in distributing data through the network. As a result, such networks can dynamically reconfigure themselves and create ad-hoc wireless network connections. The networks can adapt to environmental changes and electromagnetic interferences. More specifically, in the present system, several door systems 30 function as separate nodes in the mesh network. Information is relayed between the door systems 30 on its path to the central control system 42 and/or door control modules 80. Likewise, information is distributed from the central control system 42 and the door control modules 80 to the door systems 30 through the same mesh network.

The access reader 50-1 enables users carrying BLE-enabled user devices 103 to present credentials 77 of users. Examples of user devices 103 include mobile phones and tablet/phablet devices running a mobile operating system such as Apple iOS and Google Android. Android is a registered trademark of Google, Inc. and iOS is a registered trademark of Apple, Inc.

The user devices 103 present credentials 77 when the user devices 103 are located in a threshold area that is within range of the BLE transceiver 47, such as near the door frame 32. Applications (e.g. "apps") 114 executing on an operating system of the user devices 103 include and present the credentials 77 to the BLE transceiver 47 of the access reader 50-1, over the BLE wireless channel 79. The BLE transceiver 47 receives the user credentials 77 and the access reader 50-1 forwards the user credentials 77 to the door controller 84, which in turn sends the user credentials 77 via the duplex communications channel to the door control module 80. The door control module 80 then sends the credentials 77 for verification by the central control system 42.

The door controller 84 also communicates with the touch sensing door plate 24. In one example, the door controller 84 receives an indication from the touch sensing door plate 24 that an individual is present at the door body 31. The door controller 84, in response, instructs the access reader 50-1 to listen for user credentials 77 sent by the user devices 103. In another example, in response to receiving the indication from the touch sensing door plate 24, the door controller 84 sends a request to unlock the door 30 over the duplex communications channel to the door control module 80.

In one implementation, the door controller 84 maintains a local cache of user credentials 77 of authorized users. When the door controller 84 determines that the user credentials 77 sent by the BLE transceiver 47 of the access reader 50-1 are not in the local cache, or for global features such as anti-passback, the door controller 84 sends the user credentials 77 to the central control system 42 via the duplex communications channel for verification.

One or more detection devices 39 are also carried by the door body 31 of the door 30. The detection devices 39 can be carried on either side of the door body 31. In one example, the detection devices 39 detect phenomena near the door body 31, such as temperature and harmful vapors within an internal room 33 of the building 90. In another example, the detection devices 39 detect phenomena associated with the door body 31 itself. A strain gauge detection device carried by the door body 31, for example, detects pressure exerted upon the door body 31. The detection devices 39 communicate with the door controller 84 via wired or wireless interfaces, in examples.

After the door controller 84 sends the signage information 53 for display on the interactive display 96, the door controller 84 can also receive messages sent from the interactive display 96 in response. The interactive display 96 functions as a portal through which users can send messages back to the door control module 80, in one example. Users interact with and provide information to the interactive display 96 via hand gestures and/or input devices such as soft keys or an electronic touchpad, in examples. The interactive display 96 sends the information in messages to the door controller 84, which in turn forwards the messages over the duplex communications channel to the door control module 80.

The door controller 84 also receives and processes sensor data 73 sent from the detection devices 39. The door controller 84 sends the sensor data 73 to the door control module 80 and/or central control system 42 via the duplex communications channel. The door controller 84 also sends the sensor data 73 for presentation on the interactive display 96. In one example, the sensor data 73 presented on the interactive display 96 warns users about potential hazards within interior rooms 33, in one example.

Other examples that illustrate the ability for the door system 30 to receive and display information such as signage information 53 and then respond to the signage information 53 are described herein below.

In one example, the door system 30 can receive signage information 53 in response to a user approaching the door body 31. For example, when the door controller 84 receives an indication from the touch sensing door sensor 24 that a user is present at the door body 31, the door controller 84 can signal the door control module 80 via the duplex communications channel to provide the signage information 53. The door control module 80 accesses the signage information 53 from the database 15, and sends the signage information 53 to the door controller 84 via the duplex communications channel. The door controller 84 then sends the signage information 53 for display upon the interactive display 96.

In another example, the door system 30 can receive data such as signage information 53 in an unsolicited fashion. For example, during a fire within the building 90, the door control module 80 might obtain signage information 53 from the central control system 42 and/or database 15. The signage information 53 might include information concerning locations/areas within the building 90 that are blocked due to the fire or include smoke, information that marks out exit path(s) within the building, and warning messages, in examples. The door control module 80 sends the signage information 53 to the door controller 84 via the duplex communications channel, and the door controller 84 sends the signage information 53 to the interactive display 96.

Additionally and/or alternatively, the door controller 84 can send the signage information 53 to user devices 103. For this purpose, the door controller 84 sends the signage information 53 to the access reader 50-1. The BLE transceiver 47 of the access reader 50-1 transmits the signage information 53 over the BLE wireless channel 79 to apps 114 on the user devices 103.

In one implementation, the users on the user devices 103 might be required to respond to the signage information 53 before the users can obtain access to an interior room 33. For example, the signage information 53 may include warning messages that describe potentially hazardous conditions in an interior room 33 to which the users request access. Though the user may be an authorized user, the door control module 80 may require that the user acknowledge the warning message as a condition to the door control module 80 unlocking the door system 30. To acknowledge the warning message, the user sends an acknowledgement message ("ack") via an app 114 on the user device 103.

The BLE transceiver 47 of the access reader 50-1 receives the ack over the BLE wireless channel 79, and the access reader 50-1 sends the ack to the door controller 84. The door controller 84, in turn, forwards the ack to the door control module 80 via the duplex communications channel. The door control module 80 then sends a signal to the frame magnetic lock assembly 20a to unlock the door 30.

Figure 5B:
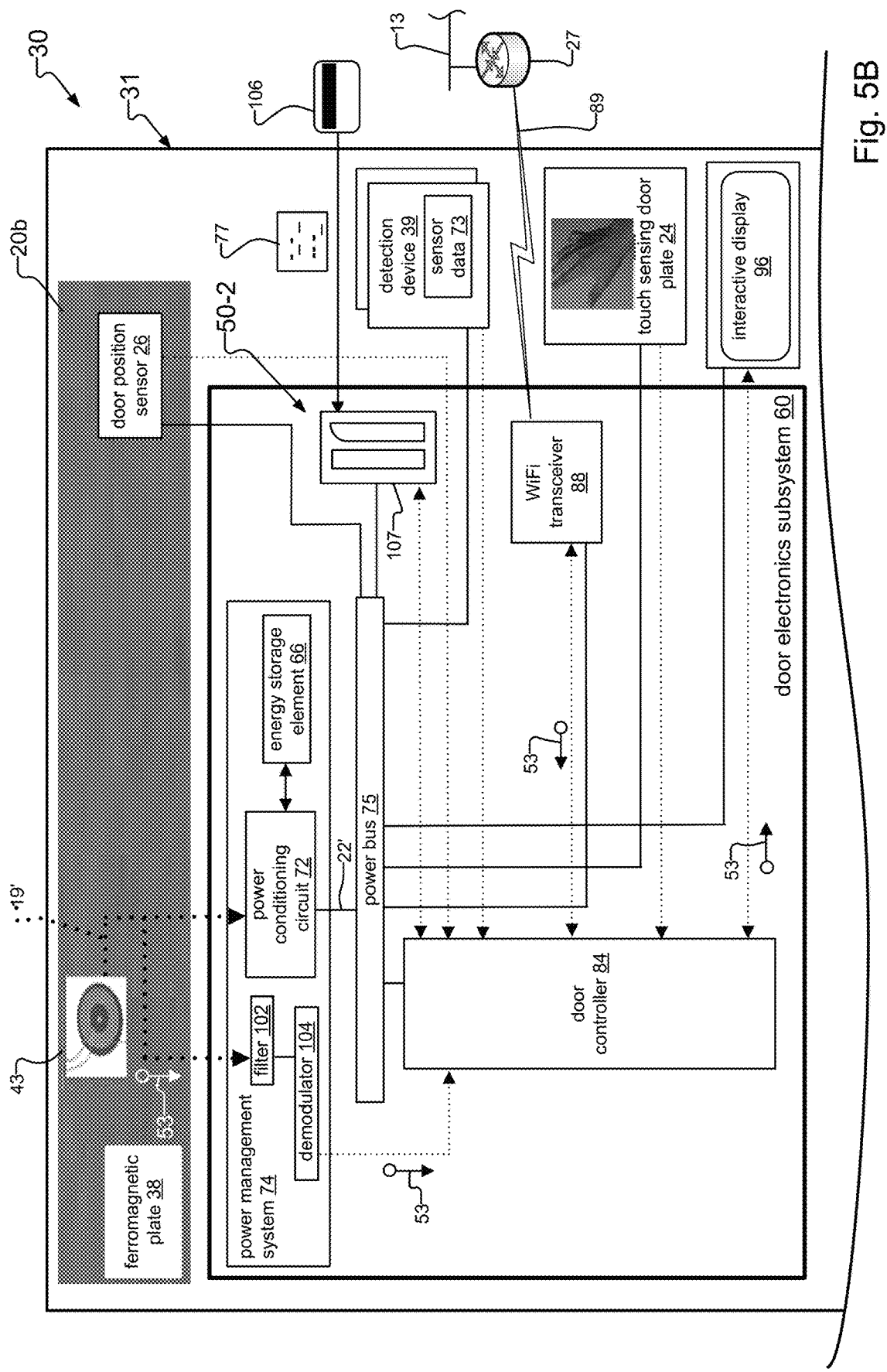
FIG. 5B shows detail for a door body of yet another embodiment of the door system, where the door body in FIG. 5B is substantially similar to that in FIG. 5A but instead carries a keycard access reader as the access reader.

FIG. 5B shows yet another embodiment of a door system 30. The door system 30 functions in a substantially similar way as in the door system 30 in FIG. 5A and includes substantially similar components. However, the access reader 50-1 of the door electronics subsystem 60 in FIG. 5A is replaced with a keycard access reader 50-2 in FIG. 5B. Users present their credentials 77 to the keycard access reader 50-2 via keycard 106. The keycard access reader 50-2 sends the credentials 77 to the door controller 84, which then transmits the credentials 77 over the duplex communications channel to the door control module 80.

In the previous examples, the door systems 30 directly connect to the enterprise network 13 via a wireless access point 27 or similar device. In some instances, however, the door systems 30 may be located in parts of the building or other locations where access to the existing wireless infrastructure is not available due to shielding and interference.

Figure 6:
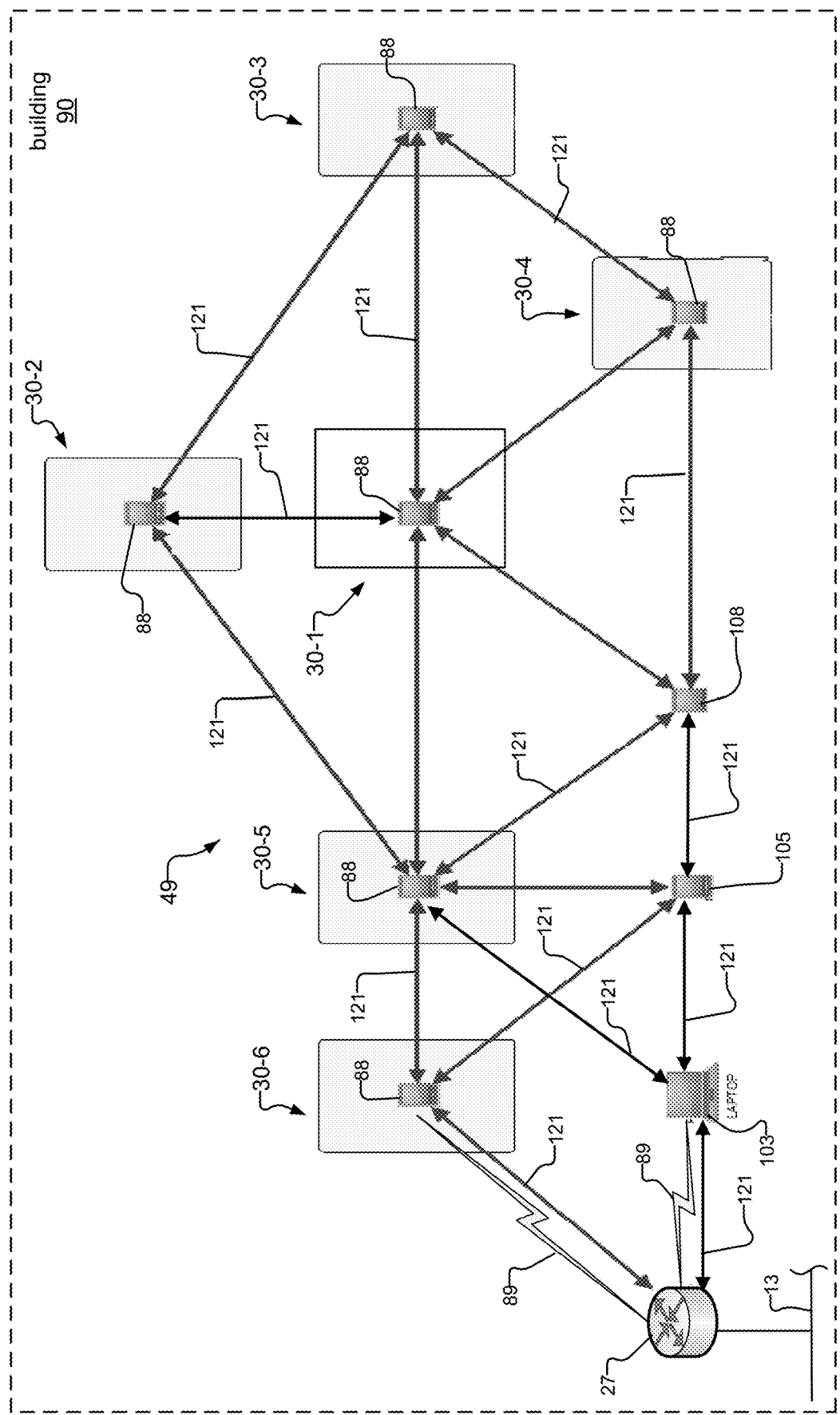
FIG. 6 is a schematic diagram showing door systems functioning as nodes in a mesh network at a building.

FIG. 6 shows the door systems 30 functioning as nodes in a mesh network 49 in a building 90. Such a topology can be used to provide connectivity for door systems 30 when access to the existing wireless infrastructure is not available or otherwise degraded.

These door systems 30 are connected to each other through point-to-point wireless data links 121. In the illustrated example, the wireless links are maintained by the door systems' WiFi transceivers 88. However in other embodiments, other transceivers are used, such as the Bluetooth (BLE) 47 transceivers.

This network 49 enables edge devices, such as door systems 30-2 and 30-3, to indirectly access the enterprise network 13 via the access point 27, even when they might be too distant and/or shielded. Messages to door system 30-3, for example, from the central control system 42 are relayed through door system 30-5 and possibly through door system 30-2 to reach door system 30-3, in one specific example. Likewise, messages from door system 30-3 to the central control system 42 are relayed back through the same door system nodes or other connected nodes.

A defective or disconnected node will not prevent data transmission. As shown, each door system node is preferably connected to several other nodes through separate wireless data links 121. This feature facilitates the relay of data either around network defects and/or for increased speed. A defective node/device will be ignored by the nodes and the surrounding nodes will then find new routings that connect with the other nodes and/or any wireless access points.

The nodes of the mesh network do not have to be exclusively door systems 30. In the illustrated example, other wireless devices form additional nodes in the network 49. For example, in the illustrated example, laptop computer 103 forms a node in the network 49. Further, building management devices 105, 108 function as additional wireless nodes. Examples of these building management devices include secure access devices, lighting devices, HVAC devices, security devices, and safety devices.

While this invention has been particularly shown and described with references to preferred embodiments thereof, it will be understood by those skilled in the art that various changes in form and details may be made therein without departing from the scope of the invention encompassed by the appended claims.

What is claimed is:

1. A door system, comprising:
    a door body;
    a display device, carried by the door body, that electronically receives signage information and displays the signage information;
    a power management system, carried by the door body, that powers the display device;
    a door controller, carried by the door body, that controls the power management system and the other devices carried by the door body, in response to the door controller receiving an indication of a user being at the door body sent from at least one of the other devices carried by the door body, the door controller sends a request message to a door control module to unlock the door system; and
    a fire sensor device carried by the door body by mounting the fire sensor device within an opening in an interior skin of the door body, wherein the fire sensor device detects physical phenomena within a room.

2. A door system as claimed in claim 1, further comprising an access reader, carried by the door body, that reads user credentials of users.

3. A door system as claimed in claim 2, wherein the access reader includes a Bluetooth Low Energy (BLE) transceiver for receiving the user credentials from a user device.

4. A door system as claimed in claim 1, further comprising a door position sensor, carried by the door body, for reporting an open and/or closed state of the door body.

5. A door system as claimed in claim 1, further comprising a touch sensing door plate carried by the door body for detecting a user touching the door body.

6. A door system as claimed in claim 1, further comprising a magnetic lock system, wherein the door control module locks the door system by controlling the magnetic lock system.

7. The door system of claim 6, wherein the magnetic lock system includes a frame magnetic lock assembly on a door frame for the door body and a door magnetic lock assembly including a ferromagnetic plate carried by the door body.

8. A door system as claimed in claim 1, further comprising a WiFi transceiver carried by the door body for communicating with a central control system.

9. A door system as claimed in claim 1, further comprising one or more detection devices, carried by the door body, which detect physical phenomena within and/or near the door body.

10. A door as claimed in claim 1, further comprising an inductive power receiver, carried by the door body, that receives inductively transferred power from an inductive power transmitter included within a door frame, wherein the inductive power receiver provides power to the power management system.

11. A door system as claimed in claim 1, wherein the signage information includes warning messages and instructions to assist users for exiting a building or sheltering in place.

12. A door system as claimed in claim 11 wherein the door controller receives the signage information from the power management system via an inductive power receiver and demodulator of the power management system, the inductive power receiver receiving a modulated ac power signal for powering the door system and the demodulator extracting the signage information by demodulating the modulated ac power signal.

13. A door system as claimed in claim 12, wherein a filter of the power management system first filters the modulated ac power signal, and the demodulator then extracts the signage information.

14. A door system as claimed in claim 12, wherein the door system obtains the signage information from a central control system during an emergency.

15. A door system as claimed in claim 1, wherein the fire sensor device detects heat or flame or smoke.

16. A door system as claimed in claim 15, wherein the signage information includes information concerning locations/areas within building that are blocked due to fire.

17. A door system as claimed in claim 16, the door controller sends the signage information to user devices via a wireless transceiver of an access reader of the door system, which transmits the signage information over a wireless channel to apps executing on the user devices.

18. A door system as claimed in claim 17, wherein the signage information includes warning messages that describe potentially hazardous conditions in an interior room to which users of the user devices are requesting access, and the door controller requires that the users acknowledge the warning messages before unlocking the door system.

19. A door system as claimed in claim 18, wherein the apps executing on the user devices enable sending of acknowledgment messages to acknowledge the warning messages to the door system.

20. A door system as claimed in claim 16, wherein the display device presents sensor data from sensors of the fire sensor device.

21. A method for a door system, the method comprising:
a door body of the door system carrying a power management system;
the power management system providing power to other devices carried by the door body;
a display device, carried by the door body and powered by the power management system, electronically receiving signage information and displaying the signage information upon the display device;
a door controller controlling the power management system and the other devices carried by the door body and receiving an indication of a user being at the door body sent from at least one of the other devices carried by the door body, the door controller sending a request message to a door control module to unlock the door system; and
a fire sensor device, carried by the door body by mounting the fire sensor device within an opening in an interior skin of the door body, detecting physical phenomena within a room.

22. The method of claim 21, further comprising an access reader, carried by the door body, reading user credentials of users.

23. The method of claim 21, further comprising a door position sensor, carried by the door body, reporting an open and/or closed state of the door body.

24. The method of claim 21, further comprising a touch sensing door plate, carried by the door body, detecting a user touching the door body.

25. The method of claim 21, further comprising a door controller, carried by the door body, controlling the power management system and the other devices carried by the door body.

26. The method of claim 25, further comprising a WiFi transceiver carried by the door body communicating with a central control system.

27. The method of claim 25, further comprising one or more detection devices, carried by the door body, detecting physical phenomena within and/or near the door body.

* * * * *